(12) United States Patent
Janakiraman et al.

(10) Patent No.: US 9,298,560 B2
(45) Date of Patent: Mar. 29, 2016

(54) SYSTEM AND METHOD FOR GTP SESSION PERSISTENCE AND RECOVERY

(71) Applicant: Tektronix, Inc., Plano, TX (US)

(72) Inventors: Vignesh Janakiraman, Plano, TX (US);
Aleksey G. Ivershen, Garland, TX (US);
John P. Curtin, Richardson, TX (US)

(73) Assignee: Tektronix Texas, Inc., Westford, MA (US)

( * ) Notice: Subject to any disclaimer, the term of this patent is extended or adjusted under 35 U.S.C. 154(b) by 429 days.

(21) Appl. No.: 13/895,639

(22) Filed: May 16, 2013

(65) Prior Publication Data
US 2014/0344441 A1   Nov. 20, 2014

(51) Int. Cl.
| | |
|---|---|
| *G06F 15/173* | (2006.01) |
| *G06F 11/14* | (2006.01) |
| *H04W 24/08* | (2009.01) |
| *H04L 12/26* | (2006.01) |
| *H04L 12/24* | (2006.01) |
| *H04W 80/04* | (2009.01) |
| *H04W 92/06* | (2009.01) |

(52) U.S. Cl.
CPC ........ *G06F 11/1446* (2013.01); *H04L 41/0654* (2013.01); *H04L 43/12* (2013.01); *H04W 24/08* (2013.01); *H04W 80/04* (2013.01); *H04W 92/06* (2013.01)

(58) Field of Classification Search
None
See application file for complete search history.

(56) References Cited

U.S. PATENT DOCUMENTS

| | | | |
|---|---|---|---|
| 8,345,603 B2 | 1/2013 | Nelakonda et al. | |
| 2008/0175248 A1* | 7/2008 | Dantuluri | H04L 43/0894 370/394 |

(Continued)

FOREIGN PATENT DOCUMENTS

| | | |
|---|---|---|
| EP | 1282997 A2 | 2/2003 |
| EP | 1487160 A2 | 12/2004 |

(Continued)

OTHER PUBLICATIONS

A. Krendzel et al. "Radio Access Netowkr Topology Planning for the 4G Networks".
"Artiza Network Lay 2 Structure", http://www.artizanetworks.com/lte_tut_lay_2_str.html, Mar. 21, 2013.

(Continued)

*Primary Examiner* — Mohamed Ibrahim
(74) *Attorney, Agent, or Firm* — Locke Lord LLP; Scott D. Wofsy; Christopher J. Capelli (57) ABSTRACT

A method for monitoring GPRS Tunneling Protocol (GTP) sessions in a mobile communication network having a monitoring module. The method includes the steps of monitoring, by the monitoring module, a plurality of subscriber GTP sessions, and storing recovery parameters related to the subscriber GTP sessions and subscribers associated therewith in records in a database in the monitoring module, wherein the recovery parameters are associated with initial session data for each subscriber GTP session. Upon an outage in monitoring, the method restarts the monitoring module to determine restart parameters associated with existing subscriber GTP sessions and subscribers associated therewith in the records in the database wherein the restart parameters are associated with subsequent session data for each subscriber GTP session. Before attempting to process any packets, the method associates the subsequent session data with the initial session data based upon comparing the recovery parameters with the restart parameters.

17 Claims, 4 Drawing Sheets

(56) References Cited

U.S. PATENT DOCUMENTS

| | | |
|---|---|---|
| 2009/0088147 A1 | 4/2009 | Bu et al. |
| 2010/0322068 A1* | 12/2010 | Grahn ................ H04W 76/021 370/217 |
| 2012/0096177 A1* | 4/2012 | Rasanen ................ H04L 69/40 709/228 |
| 2013/0031575 A1 | 1/2013 | Gallant et al. |

FOREIGN PATENT DOCUMENTS

| | | |
|---|---|---|
| EP | 2018731 A1 | 1/2009 |
| EP | 2529579 A1 | 12/2012 |

OTHER PUBLICATIONS

Extended European Search Report dated Oct. 20, 2014 for European Patent Application No. 14168649.3.

* cited by examiner

SYSTEM AND METHOD FOR GTP SESSION PERSISTENCE AND RECOVERY

BACKGROUND OF THE INVENTION

1. Field of the Invention

The subject disclosure relates to systems and methods for monitoring General Packet Radio Service (GPRS) Tunneling Protocol (GTP) sessions in a mobile communication network, and more particularly to methods and systems for monitoring a GTP session data through an outage or interruption in the monitoring.

2. Background of the Related Art

In wireless communication network, it is desirable to monitor subscriber sessions to evaluate the network performance, to collect useful information regarding user habits, and the like. When a GTP session is started, the tunnel establishment message has the necessary information to identify the subscriber. Thus, if outages of the monitoring equipment occur, current systems are unable to correlate the GTP session data with a subscriber. The subscriber session data associated with these sessions becomes unassigned and effectively lost because the current systems are unable to determine which session or subscriber to associate with the unassigned data.

SUMMARY OF THE INVENTION

In view of the above, it is desirable to improve upon subscriber traffic visibility by being able to identify and recover otherwise lost session data due to an outage (planned or otherwise) of the monitoring system.

In one embodiment, the subject technology is directed to a method for monitoring General Packet Radio Service (GPRS) Tunneling Protocol (GTP) sessions in a mobile communication network having a monitoring module. The method includes the steps of monitoring, by the monitoring module, a plurality of subscriber GTP sessions, and storing recovery parameters related to the subscriber GTP sessions and subscribers associated therewith in records in a database in the monitoring module, wherein the recovery parameters are associated with initial session data for each subscriber GTP session. Upon an outage in monitoring, the method restarts the monitoring module to determine restart parameters associated with existing subscriber GTP sessions and subscribers associated therewith in the records in the database wherein the restart parameters are associated with subsequent session data for each subscriber GTP session. Before attempting to process any packets, the method associates the subsequent session data with the initial session data based upon comparing the recovery parameters with the restart parameters.

The method may further include the steps of correlating downlink TEID parameters associated with subsequent session data with uplink TEID parameters associated with initial session data when the subsequent session data and the initial session data corresponds to the same subscriber GTP session, starting a new monitoring session if the recovery parameters do not correlate with the restart parameters, and/or adding a downlink F-TEID to the subsequent session data for the correlated GTP sessions. The step of incorporating data related to monitoring for an initial portion of the subscriber GTP session with a subsequent portion of the subscriber GTP session when correlation is successful so that session data resulting from monitoring is all properly assigned to a correct subscriber may also be performed.

The recovery parameters are comprised of the group consisting of subscriber digits, a mobile IP, an uplink TEID, a downlink TEID, a linked bearer ID, IP address, and combinations thereof. In one embodiment, the method updates the records in the database whenever a user-plane bearer is created, modified or deleted.

Another method for maintaining monitoring of GTP sessions in a mobile communication network after an outage of a monitoring module includes the steps of: storing recovery data and session data by the monitoring module for a plurality of a monitoring session associated with a plurality of GTP sessions, the recovery data including an Internet Protocol (IP) address and tunnel endpoint identifier (TEID) for each GTP session at a start of each GTP session and the session data including statistics related to each GTP session; upon restart of the monitoring module after an outage of monitoring, searching the recovery data for a correlation in new activity data, the new activity data being parameters associated with existing GTP sessions; validating the correlation based on the new activity data; and rebuilding the monitoring sessions for the validated GTP sessions to include new session data based on the new activity data and associating the new session data with the session data corresponding to the corresponding GTP session. Preferably, the recovery data is persistently stored to disk.

The subject technology is also directed to a module for monitoring a communication network including (a) a memory storing an instruction set and data related to a plurality of communication sessions in the communication network; and (b) a processor for running the instruction set, the processor being in communication with the memory and the communication network, wherein the processor is operative to: (i) monitor the plurality of communication sessions; (ii) store recovery parameters related to the communication sessions and subscribers associated therewith in records in a database, wherein the recovery parameters are associated with initial session data for each communication session; (iii) upon an outage in monitoring, restart to determine restart parameters associated with existing subscriber GTP sessions and subscribers associated therewith in the records in the database, wherein the restart parameters are associated with subsequent session data for each communication session; and (iv) before attempting to process any packets, associate the subsequent session data with the initial session data based upon comparing the recovery parameters with the restart parameters. The module may be further operative to correlate downlink TEID parameters associated with subsequent session data with uplink TEID parameters associated with initial session data when the subsequent session data and the initial session data corresponds to the same communication session and start a new monitoring session if the recovery parameters do not correlate with the restart parameters. The processor may be further operative to add a downlink F-TEID to the subsequent session data for the correlated GTP sessions, update the records in the database whenever a user-plane bearer is created, update the records in the database whenever a user-plane bearer is deleted, and/or update the records in the database whenever a user-plane bearer is modified.

It should be appreciated that the subject technology can be implemented and utilized in numerous ways, including without limitation as a process, an apparatus, a system, a device, a method for applications now known and later developed or a computer readable medium. These and other unique features of the system disclosed herein will become more readily apparent from the following description and the accompanying drawings.

BRIEF DESCRIPTION OF THE DRAWINGS

So that those having ordinary skill in the art to which the disclosed system appertains will more readily understand how to make and use the same, reference may be had to the following drawings.

DETAILED DESCRIPTION OF PREFERRED EMBODIMENTS

The subject technology overcomes many of the prior art problems associated with providing extended endpoint to endpoint sessions while monitoring GTP sessions in the communications network. The advantages, and other features of the systems and methods disclosed herein, will become more readily apparent to those having ordinary skill in the art from the following detailed description of certain preferred embodiments taken in conjunction with the drawings which set forth representative embodiments of the present invention and wherein like reference numerals identify similar structural elements.

DEFINITIONS AND ACRONYMS

A module, node, station or a gateway is a functional aspect, which typically includes software and hardware. A module, node, station or a gateway encompasses the necessary components to accomplish a task. It is envisioned that the same hardware could implement a plurality of modules, nodes, stations and/or gateways. Those of ordinary skill will recognize that the software, hardware and various processes discussed herein, whether described as modules, nodes, stations, gateways or the like, are merely exemplary of the arrangement and functionality performed by the disclosed technology and thus such hardware, processes and/or their equivalents may be implemented in commercial embodiments in various combinations without materially affecting the operation or utility of the disclosed technology.

Radio Access Network (RAN) is a general term for wireless communication networks such as the Universal Mobile Telecommunications System (UMTS), which may be third generation (3G), fourth generation (4G)/Long Term Evolution (LTE) and the like.

Radio Network Controller (RNC) is an Internet Protocol (IP) router.

Gateway GPRS Support Node (GGSN) is an IP router.

Serving GPRS Support Node (SGSN) is a gateway between the RNC and the GGSN.

General Packet Radio Service (GPRS) Tunneling Protocol (GTP) is an IP-based communications protocol for carrying out GPRS in UMTS networks including 4G/LTE networks. GTP includes a group of IP-based communications protocols used to carry GPRS within networks such as LTE networks. GTP includes GTP-U, which is an IP based tunneling protocol which permits tunnels between end points and is used to carry user data, and GTP-C, which is used on the control plane such as signaling between GGSN and SGSN.

Mobility Management Entity (MME) is another node in a communications network for network monitoring.

Evolved Universal Mobile Telecommunications System Terrestrial Radio Access Network (E-UTRAN) is a collection of base stations in a wireless communication network.

Serving Gateway (S-GW) is another node in a communications network for network monitoring.

Packet Data Network Gateway (P-GW) is still another node in a communications network for network monitoring.

Tunnel Endpoint Identifier (TEID) is part of a GTP-U message.

Fully Qualified TEID (F-TEID) is the TEID plus the actual IP address associated with the TEID. A F-TEID can simultaneously have both an IPv4 and an IPv6 address.

Protocol Data Unit (PDU) is a unit of data which is specified in a protocol of a given layer and which consists of protocol-control information and user data of that layer.

Downlink is the side of a GTP tunnel towards the mobile device.

Uplink is the side of a GTP tunnel away from the mobile device.

Figure 1A:
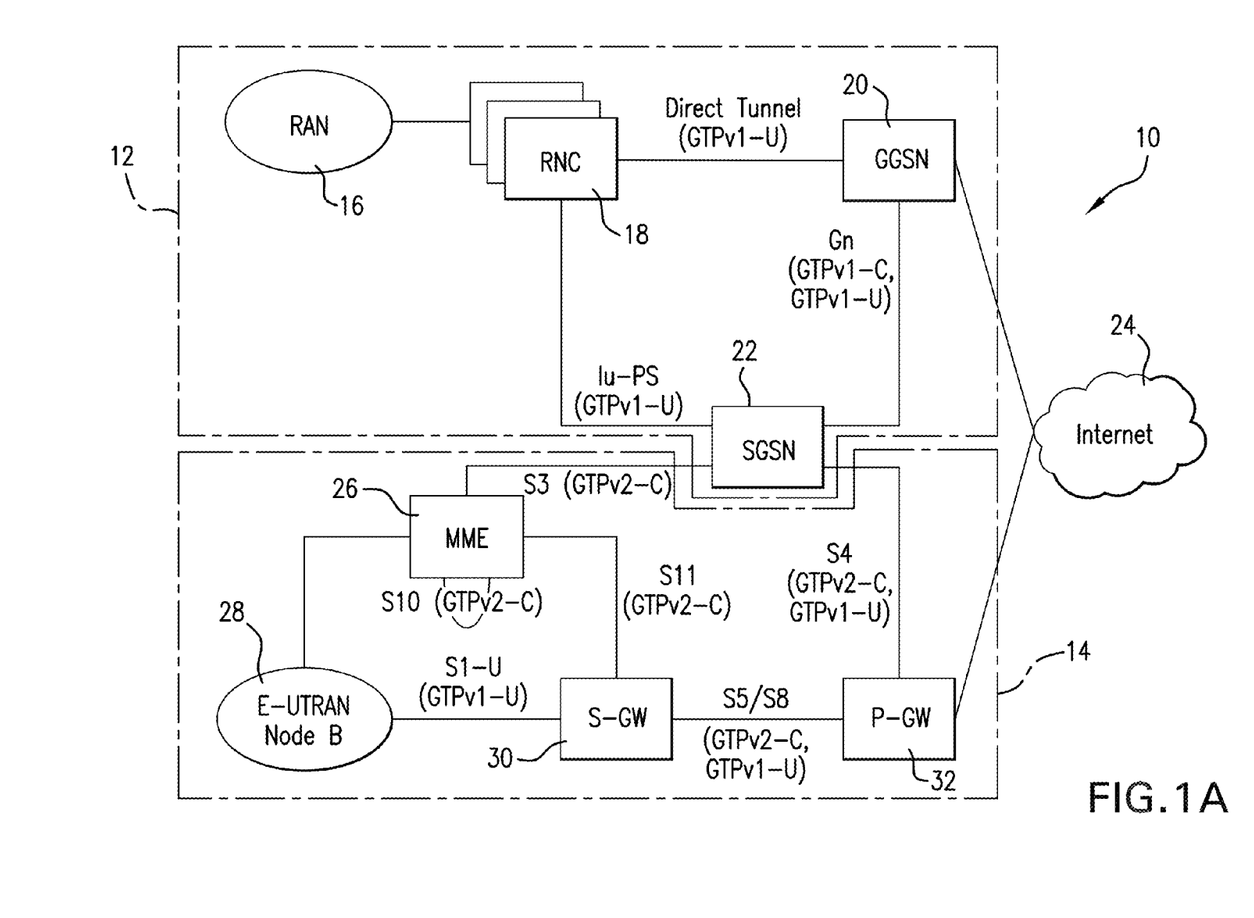
FIG. 1A is a block diagram showing an environment for maintaining General Packet Radio Service (GPRS) Tunneling Protocol (GTP) sessions, and more particularly the environment includes a monitoring module for recovering GTP session data after an interruption in monitoring and establishing monitoring the GTP session in accordance with the subject technology.

Referring now to the FIG. 1A, there is shown a block diagram of a wireless communication environment 10 with a first provider network 12 in communication with a second provider network 14 embodying and implementing the methodology of the present disclosure. The first provider network 12 is depicted as a typical 3G provider network for allowing communication from mobile devices to other mobile devices (not shown), the Internet 24, and other like sources and endpoints. The provider network 12 utilizes the Internet 24 for transfer communication data packets and download of content. The provider network 12 may include a wireless broadband network, a 3G network, a 4G network, a 3GPP Long Term Evolution (LTE) network, a voice-over-IP (VoIP) network, an IP Multimedia Subsystem (IMS) network, etc.

The second provider network 14 is depicted as typical 4G provider network for allowing communication from mobile devices to other mobile devices (not shown), the Internet 24, and other like sources and endpoints. Any number of provider networks may interact in various combinations of wireless broadband networks, 3G networks, 4G networks, 3GPP Long Term Evolution (LTE) networks, voice-over-IP (VoIP) networks, IP Multimedia Subsystem (IMS) networks, and the like now known and later developed.

Figure 1B:
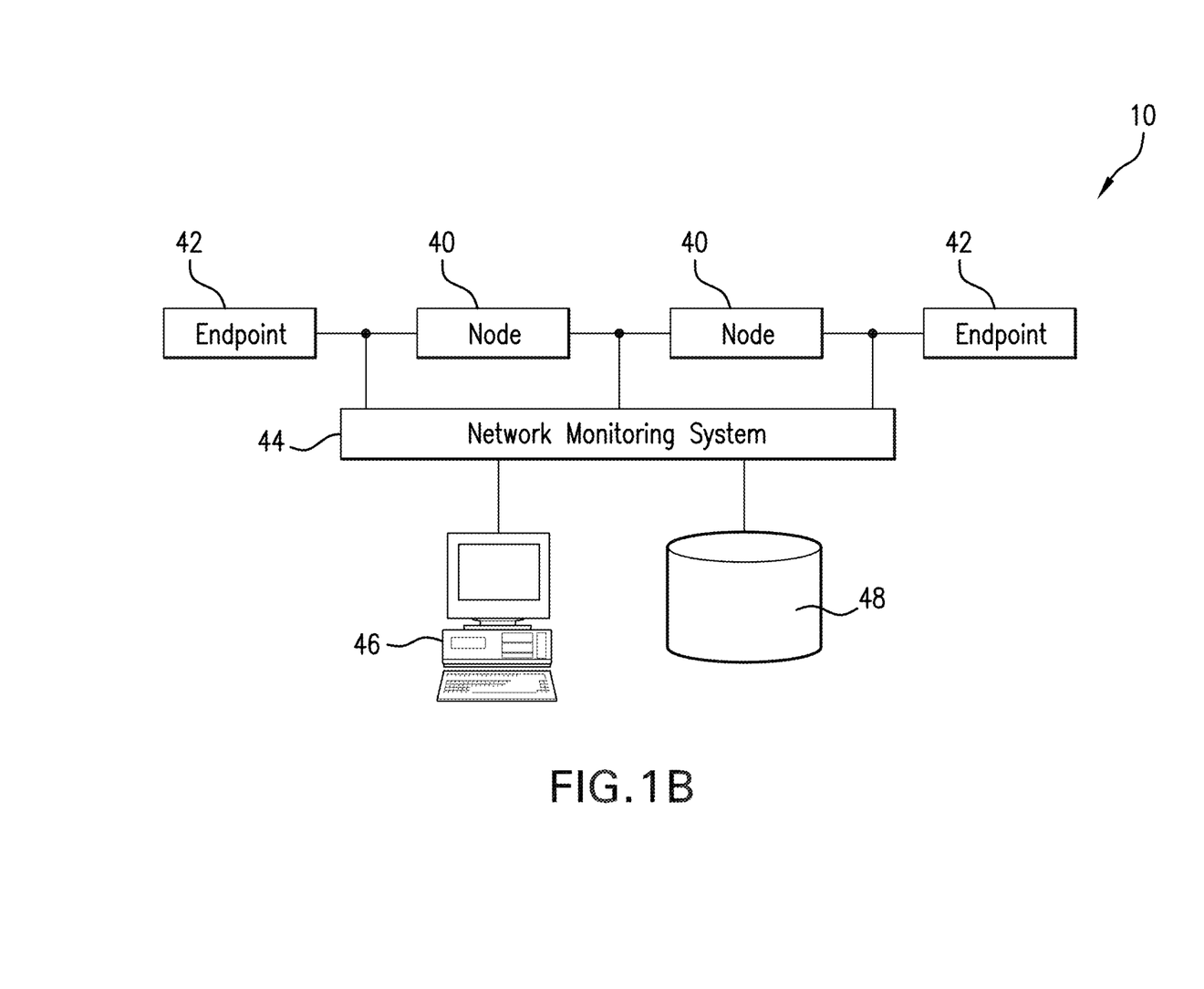
FIG. 1B is a somewhat schematic block diagram showing a monitoring module portion of the environment of FIG. 1A for recovering GTP session data after an interruption in monitoring and establishing monitoring the GTP session in accordance with the subject technology.

Referring now to FIG. 1B, a somewhat schematic block diagram showing a monitoring module portion of the environment 10 of FIG. 1A for recovering GTP session data after an interruption in monitoring and establishing monitoring the GTP session in accordance with the subject technology. As would be appreciated by those of ordinary skill in the art, FIG. 1B has been simplified for illustration by not explicitly showing the provider networks 12, 14 as distinct but rather simply as a line of nodes 40 extending between two endpoints 42 to represent how a network monitoring system 44 may connect in the environment 10.

The network monitoring system 44 uses tap points on the interfaces showing traffic replication in a passive manner. The network monitoring system 44 includes a desktop computer 46 and memory 48 for storage and execution of the functions described herein. The network monitoring system 44 provides traffic characterization, network troubleshooting, threshold-based alarm capabilities and the like as well as the features disclosed herein. The network monitoring system 44 helps the operators of the provider networks 12, 14 manage network operations, administer service portfolio lifecycles, manage intra- and inter-network services, support analysis and reporting of network performance, and provide network intelligence regarding performance and varying parameters for analysis.

Figure 1C:
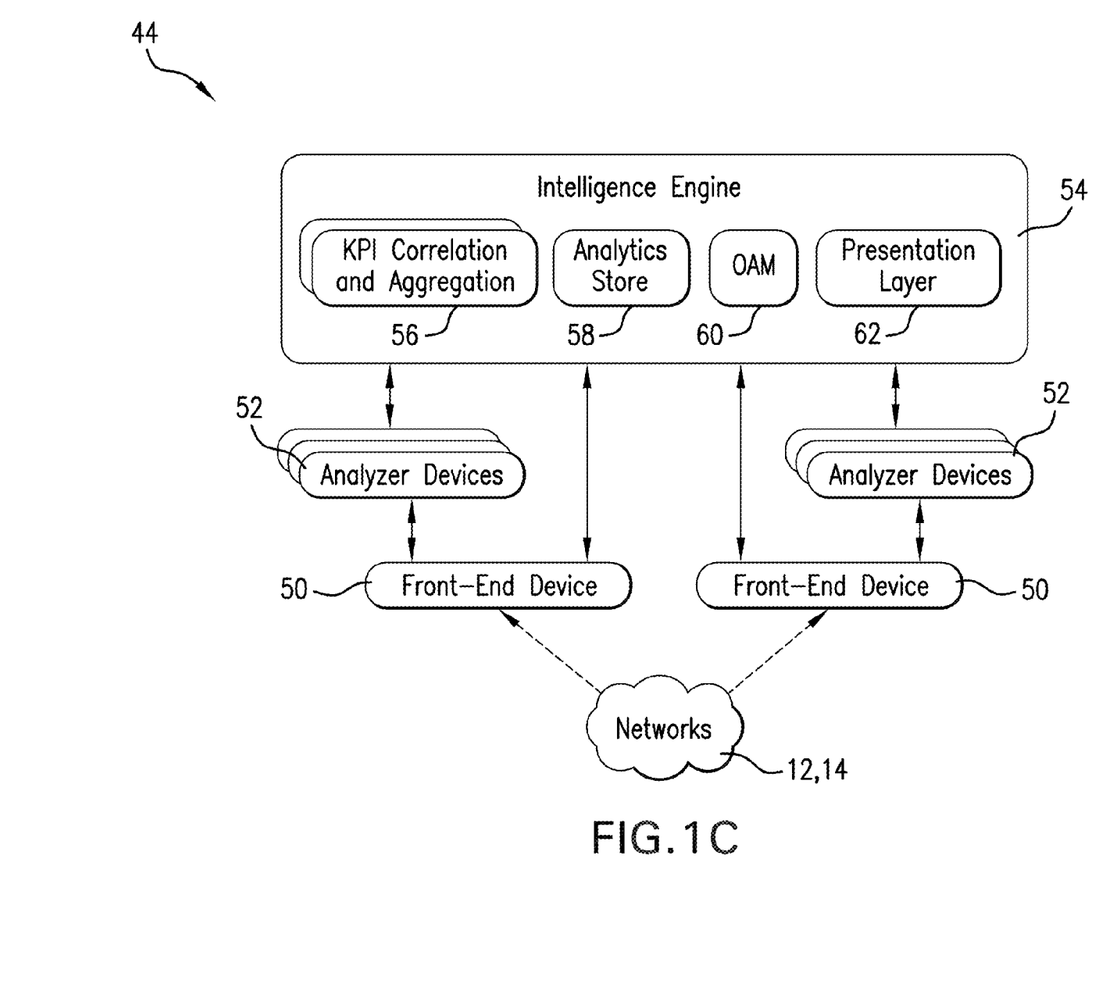
FIG. 1C is a schematic three-tiered view of the monitoring module of FIG. 1B in accordance with the subject technology.

Referring now to FIG. 1C, a schematic three-tiered view of the monitoring module 44 is shown. The monitoring module 44 preferably includes a front-end tier 50 that interacts with the networks 12, 14. The monitoring module 44 also includes an intermediate tier of analyzer devices 52 that functions as a traffic processor among other things. The analyzer devices 52 are connected between the front-end devices 50 and a back-end tier intelligence engine 54. The intelligence engine 54 includes a Key Performance Indicator (KPI) correlation and aggregation module 56, an analytics store module 58, an Operations, Administration and Management (OAM) module 60, and a presentation layer module 62.

The following discussion is centered on the structure of the environment 10. Further discussion of the applications programs and data that embody the methodology of the present technology is described with respect to FIG. 2 below among other places. The subject technology is not limited to the environment 10 shown but capable of being practiced in many different environments.

The provider network 12 includes a Radio Access Network (RAN) 16, which may be 3G, 4G/LTE and/or other types now known and later developed. In one embodiment, the RAN 16 is a plurality of base stations (not shown), also known as NodeB, in a ring technology connected to a main station (not shown) in communication with a Radio Network Controller (RNC) 18. The RNC 18 is in communication with a Gateway GPRS Support Node (GGSN) 20 and a Serving GPRS Support Node (SGSN) 22.

The GGSN 18 is in communication with the Internet 24. A tunnel is established with the GGSN to handle the data packets associated with subscriber sessions.

The SGSN 22 functions as the gateway between the RNC 18 and the GGSN 20 by handling signaling traffic to keep track of the location of mobile devices, the actual data packets being exchanged between a mobile device and the Internet, and the like. Additionally, the SGSN 22 includes a direct tunneling feature that establishes a direct user plane tunnel between the RNC 18 and the GGSN 20 so that the SGSN 22 is not required to handle the data packets and, thus, time and processing power of the SGSN 22 is conserved. However, the SGSN 22 remains responsible for much activity such as, for example, the SGSN 22 continues to be responsible to modify the direct tunnel between the RNC 18 and GGSN 20 in case the mobile device is moved to an area served by another RNC.

A Mobility Management Entity (MME) 26 is in communication with the SGSN 22, the MME 26 being part of the provider network 14. The MME 26 is also in communication with an Evolved Universal Mobile Telecommunications System Terrestrial Radio Access Network Node B (E-UTRAN Node B) 28 and a Serving Gateway (S-GW) 30, which are also in communication with each other directly. The S-GW 30 is also in communication with a Packet Data Network Gateway (P-GW) 32, which is also connected to the SGSN 22.

The links, connections and communication channels shown in FIG. 1 are not specifically limited as any type of pathway and may be any type now known and later developed. However, in FIG. 1, the links are annotated with a preferred type of protocol and other information such as the link between the RNC 18 and GGSN 20 being a direct tunnel (GTPv1-U) link as would be within the skill of one in the art to accomplish. Similarly, the elements of FIG. 1 are shown as block diagrams because the particular hardware is any of a number of devices known to those skilled in the art that can be operably connected in a communication network so as to link mobile devices or like devices. For simplicity, such general common details are not discussed in detail as one of ordinary skill in the art is familiar with them.

Figure 2:
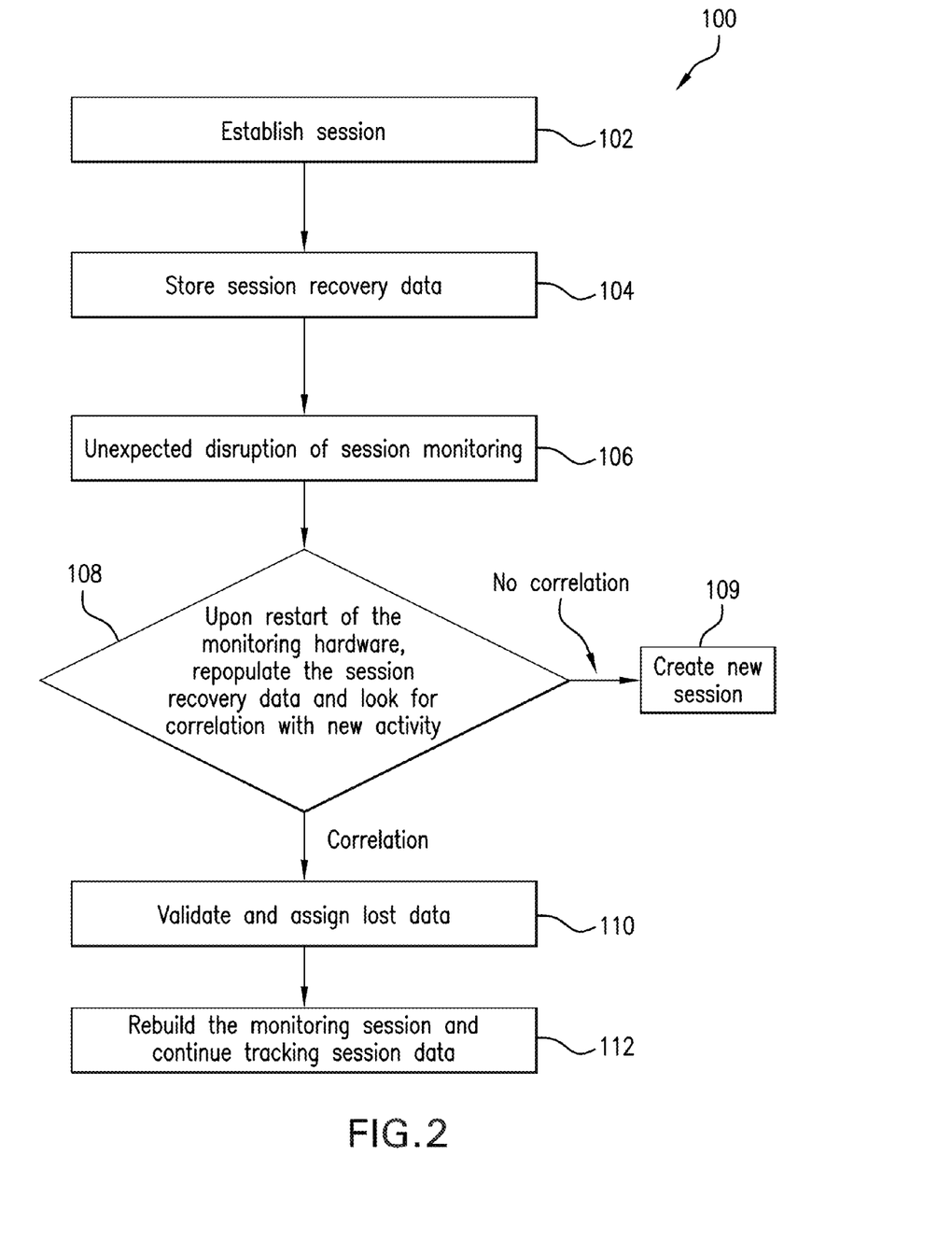
FIG. 2 is a flowchart of a process of monitoring GTP sessions performed in the environment of FIG. 1 in accordance with the subject technology.

Referring now to FIG. 2, there is illustrated a flowchart 100 depicting a process for monitoring General Packet Radio Service (GPRS) Tunneling Protocol (GTP) sessions in a mobile communication network, and more particularly to methods and systems for recovering GTP session data after a disruption in the monitoring in accordance with an embodiment of the present technology. The flowchart 100 illustrates the structure or the logic of the present technology. As such, the present technology may be practiced by machine components that house multiple databases necessary for the proper operation of the methods and renders the elements in a form that instructs a digital processing apparatus (e.g., a computer or server) to perform a sequence of function steps.

In brief overview, the subject technology allows maintaining monitoring of GTP tunnels for great lengths of time by being able to rebuild the monitoring session and recover data associated with a session where the monitoring is unexpectedly disrupted.

At step 102 of the flowchart 100, a subscriber GTP session is established. Once the subscriber GTP session is established, parameters related to the session such as TEID, IMSI, APN and the like are tracked and stored. Despite the overhead of keeping the tunnel associated with the session open, it has become efficient to leave the tunnel open for an extended period. In the past, the tunnels would be torn down after several hours. Thus, in the network monitoring system 44, if the subscriber data associated with the session was lost due to an outage, the loss of data was not significant.

Currently in 4G/LTE networks, a tunnel may remain open for days, weeks, a month or even more before being torn down due to inactivity. As a result, if the monitoring module 14 goes offline, the tracked session data associated with the open GTP sessions is lost. Thus, the lost lost tracked session data likely contains data collected over a lengthy period, which is significant. The subject technology overcomes the unexpected tear down of the monitoring of the session by applying a scheme to rebuild the tunnel monitoring based on persistent GTP session data stored to disk, and recover and reassign the otherwise lost session data to the subscriber's session.

At step 104, session recovery data is persistently stored by the network monitoring system 44 to disk memory 48 for later use in rebuilding monitoring the subscriber GTP session after an outage or other interruption. Table 1 below shows the values that are persistently stored. Preferably, the uplink TEID parameters (e.g., GGSN 20, S-GW 30, P-GW 32 side) are stored for session recovery. It is not necessary to store the downlink TEID parameters (e.g., RNC 18, SGSN 22 side) and, as a result, there is a savings of complexity and memory, and because the uplink side tends to remain largely stable for reasonable length outages. In another embodiment, the downlink TEID parameters are also persistently stored.

TABLE 1

| Key | Result | Notes | | | | |
|---|---|---|---|---|---|---|
| Session Identifier | 1x Uplink Control-Plane F-TEID | | Uplink TEID and up to two uplink IP addresses associated therewith | | | |
| | 12x Uplink User-Plane Bearers (up to 12 different APNs) | APN# for each APN, list of, | Up to 2x MSIP Bearer Id | Uplink User TEID, Up to 2x IP Addresses | Linked Bearer Id |
| | IMSI | | | | | |
| | IMEI | | | | | |
| | MSISDN | | | | | |

As can be seen, only a sub-part of the session tracking data is stored. Thus, the subject technology is not a simple store-to-disk and restore process. For the "APN #," there may be one or two MSIP (mobile subscriber IP addresses). The "up to 2× Uplink IP Addresses" are associated with the UPLINK User TEID.

In one embodiment, a digit archive process is used to store the recovery data and perform persistent backups when needed. The digit archive process runs independently from the main traffic processing entity of the network monitoring system 44 to avoid significant impact on real-time processing, unnecessary loading and efficiently perform storage in memory rather than repeatedly update to disk. Whenever a new session is created, the traffic processor triggers creation of a new digit archive entry and also triggers updates whenever a user-plane bearer is created or deleted.

At step 106 of flowchart 100, a disruption of the monitoring for the subscriber GTP session occurs by the network monitoring system 44 going offline. The disruption may be due to a power outage (planned or otherwise), component failure, blade upgrade, blade restart, and the like. No matter the intent or the length of the outage, portions of the session undergo changes while the network monitoring system 44 is offline. Typically, downlink TEIDs are immediately changed due to handovers and recycling of downlink TEIDs. Thus, in order to rebuild the subscriber GTP session, the changed downlink TEID must be determined and associated back to the previously existing subscriber GTP session so the relevant subscriber session data can be properly associated with the subscriber and the associated GTP session. The uplink TEID may not change, but if the uplink TEID does change, the change must be identified and correlated otherwise miscorrelation of the session tracking data from different subscribers will be attributed to a single session.

At step 108, after a restart of the network monitoring system 44, in order for a successful recovery, the network monitoring system 44 must handle the uplink and downlink TEID changes that happen during the outage. To do so, the persistent uplink TEID parameters are restored from the disk memory 48 and an example of the persistent uplink TEID parameters is shown below in Table 2.

These Table 2 entries or restored session contexts are populated into subscriber GTP session tracking and look-up memory before attempting to process any packets. Upon further activity (i.g., initiation of GTP-C transactions), an attempt is made to correlate the new activity with the restored session contexts.

The new activity may not contain uplink F-TEID values for either the control-plane or the user-plane, thus the activity may not be correlated with the restored session contexts. If there is no correlation, the process 100 proceeds to step 109 and a new session is created. To avoid creating extraneous partial sessions, the network monitoring system 44 allows new session allocation only on an uplink GTP-C message.

Still referring to step 108, initial user-plane data flow after the recovery will not correlate with the restored session context until an uplink Protocol Data Unit (PDU) is received by the respective front-end device module 50. To make sure that the data flow is correlated, a scheme of performing look-up on the first packet of each direction is executed. In short, a two step process occurs. Initially, the Uplink User TEID with MSIP is validated. The uplink user-plane F-TEID and the mobile IP must match between the received GTP-U PDU and the associated persistent session data stored on disk before the associated persistent session data stored on disk can be incorporated into the session. Once such match occurs, the process proceeds to validation. Then, correlation to a downlink PDU is made using the 5-tuple so that the TEID from the downlink PDU can be extracted and populated into the restored session data.

Once a match is identified/correlated, the downlink F-TEID for that activity is added to the session context. User Plane PDUs can now be tracked and assigned the Session Identifier as referenced in the stored session data. After receiving a user-plane PDU with a Session ID for a session, which may or may not exist or does not have subscriber digits, the traffic processor aspect of the analyzer devices 52 of the network monitoring system 44 issues an asynchronous look-up to the digit archive process using the Session ID as the key to retrieve the associated persistent session data stored on disk.

TABLE 2

| Key | Result | Notes | | | | |
|---|---|---|---|---|---|---|
| Session Identifier | 1x Uplink Control-Plane F-TEID | | Uplink TEID and up to two uplink IP addresses | | | |
| | 12x Uplink User-Plane Bearers (up to 12 different APNs) | APN# for each APN, list of: | Up to 2x MSIP Bearer Id | Uplink User TEID, Up to 2x Uplink IP Address | Linked Bearer Id |

In other words, the network monitoring system 44 correlates any new downlink TEID parameters with the previous sessions with the existing uplink TEID parameters in the restored session contexts. If correlation is successful, the process 100 proceeds to step 110.

At step 110, after the subscriber GTP session has been identified and recovered using the persistent uplink TEID data, the subscriber GTP session is validated. If the uplink TEID was not de-allocated and reused for another session during the outage, the subscriber GTP session is considered validated. Typically, the subscriber IP address in the GTP-U PDU and the uplink TEID are used to validate the subscriber GTP session. If these parameters match, it is unlikely that the same subscriber IP address and uplink TEID were both reallocated to a different subscriber during the outage. Instead, it is simply an indication that the session is ongoing and the persistent subscriber session data associated with this session can be properly used in the monitoring data for that session.

Once the uplink TEID has been recovered and validated, the corresponding downlink TEID is determined even though the downlink TEID has likely been reassigned during the outage. If the downlink TEID has not been reassigned, the downlink TEID is determined by simply looking at the control plane signaling for the downlink TEID associated with validated uplink TEID. The Downlink Control Plane endpoint data can be determined through additional control plane signalling. Downlinke User Plane endpoint data can be determined through either 1) additional control plane signalling or 2) a traffic based scheme as described below.

In most circumstances, the downlink TEID for the subscriber GTP session will have been reassigned and no subsequent control plane signaling will be seen that carries the downlink TEID and the uplink TEID. To determine the downlink TEID in this case, the uplink and downlink GTP-U messages are correlated by building a 5-tuple (IP, Port, and Protocol) based on the encapsulated IP layer in the GTP-U packet. The 5-tuple is the encapsulated Source IP, Destination IP, IP Protocol field, Source L4 port, and Destination L4 Port. The 5-tuple represents a complete user flow that has both uplink and downlink packets. By associating the uplink packets of the flow with our recovered session, the reassigned downlink F-TEID from the downlink packets of the flow (once an uplink packet has been seen) can be determined.

Once the uplink and downlink PDUs are correlated, the uplink TEID, which is present in the uplink PDU, and the downlink TEID, which is present in the downlink PDU, are also correlated. This downlink TEID is then associated to the same subscriber GTP session as indicated by the uplink TEID.

When the uplink TEID has changed, the process 100 assumes that the Mobile IP validation step will fail. As a result, the network monitoring system 44 will continue monitoring the new session but the network monitoring system 44 will not be able to retrieve the subscriber digits (IMSI, IMIE, etc. . . . ).

At step 112, after validation, a new monitoring session is created or rebuilt from the restored persistent data. As a result, the data monitoring of the subscriber GTP session is restored and associated with the correct persistent data so that the session data is all properly assigned to the correct subscriber.

In view of the above, it can be seen that the consistent subscriber identification increases the amount and integrity of collected data of the monitoring module 14. Without the subject technology, the data associated with prematurely torn down session monitoring would be lost causing a significant lack of subscriber traffic visibility with weeks of such data being lost from extended sessions. Typically, the entity that runs the provider network 12 needs the subscriber visibility to enhance and evaluate performance of the provider network 12.

The subject technology also assigns subscriber digits (IMSI, IMEI, MSISDN, etc.) to GTP sessions based on the session identifier that was stored in Table 1. The subscriber digits for that particular session identifier is restored even when only GTP user plane information is monitored after an outage. It typically takes a long time to see GTP control plane signaling after the user plane. In most cases, the subscriber digits are only visible in the initial startup of the session (e.g., GTP Create PDP Context, Create Session), which makes it often impossible to identify the subscriber after the outage, without using the subject technology.

It will be appreciated by those of ordinary skill in the pertinent art that the functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., modules, nodes, gateways, databases, interfaces, connections, computers, servers and the like) shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the invention as defined by the appended claims.

What is claimed is:

1. A method for monitoring General Packet Radio Service (GPRS) Tunneling Protocol (GTP) sessions in a mobile communication network having a monitoring device, the method comprising the steps of: monitoring, by the monitoring device, a plurality of subscriber GTP sessions; storing recovery parameters related to the subscriber GTP sessions and subscribers associated therewith in records in a database in the monitoring device, wherein the recovery parameters are associated with initial session data for each subscriber GTP session; upon an outage in monitoring, correlating downlink tunnel endpoint identifier (TEID) parameters associated with subsequent session data with uplink TEID parameters associated with initial session data when the subsequent session data and the initial session data corresponds to the same subscriber GTP session; restarting the monitoring device to determine restart parameters associated with existing subscriber GTP sessions and subscribers associated therewith in the records in the database wherein the restart parameters are associated with the subsequent session data for each subscriber GTP session; and before attempting to process any packets, when the correlation is successful, associating and incorporating the subsequent session data with the initial session data based upon comparing the recovery parameters with the restart parameters so that session data resulting from monitoring is all properly assigned to a correct subscriber.

2. A method as recited in claim 1, further comprising the step of starting a new monitoring session if the recovery parameters do not correlate with the restart parameters.

3. A method as recited in claim 1, further comprising the step of adding a downlink F-TEID to the subsequent session data for the correlated GTP sessions.

4. A method as recited in claim 1, wherein the recovery parameters are comprised of the group consisting of subscriber digits, a mobile IP, an uplink TEID, a downlink TEID, a linked bearer ID, IP address, and combinations thereof.

5. A method as recited in claim 1, further comprising the step of updating the records in the database whenever a user-plane bearer is created.

6. A method as recited in claim 1, further comprising the step of updating the records in the database whenever a user-plane bearer is modified.

7. A method as recited in claim 1, further comprising the step of updating the records in the database whenever a user-plane bearer is deleted.

8. A system for monitoring a communication network, the system comprising:
   (a) a memory storing an instruction set and data related to a plurality of communication sessions in the communication network; and
   (b) a processor for running the instruction set, the processor being in communication with the memory and the communication network, wherein the processor is operative to:
      (i) monitor the plurality of communication sessions;
      (ii) store recovery parameters related to the communication sessions and subscribers associated therewith in records in a database, wherein the recovery parameters are associated with initial session data for each communication session;
      (iii) upon an outage in monitoring, correlate downlink tunnel endpoint identifier (TEID) parameters associated with subsequent session data with uplink TEID parameters associated with the initial session data when the subsequent session data and the initial session data corresponds to the same communication session;
      (iv) restart to determine restart parameters associated with existing subscriber GTP sessions and subscribers associated therewith in the records in the database, wherein the restart parameters are associated with the subsequent session data for each communication session; and
      (v) before attempting to process any packets, when the correlation is successful, associate and correlate the subsequent session data with the initial session data based upon comparing the recovery parameters with the restart parameters so that session data resulting from monitoring is all properly assigned to a correct subscriber.

9. The system as recited in claim 8, wherein the communication sessions are General Packet Radio Service (GPRS) Tunneling Protocol (GTP) sessions and a plurality of mobile devices are in communication with the communication network.

10. The system as recited in claim 8, wherein the recovery parameters and the restart parameters include subscriber digits, a mobile IP, an uplink TEID and subscriber IP address, and the associating step is based on correlation between the uplink TEIDs and subscriber IP addresses.

11. The system as recited in claim 8, wherein the processor is further operative to start a new monitoring session if the recovery parameters do not correlate with the restart parameters.

12. The system as recited in claim 8, wherein the processor is further operative to add a downlink F-TEID to the subsequent session data for the correlated GTP sessions.

13. The system as recited in claim 8, wherein the processor is further operative to update the records in the database whenever a user-plane bearer is created.

14. The system as recited in claim 8, wherein the processor is further operative to update the records in the database whenever a user-plane bearer is deleted.

15. The system as recited in claim 8, wherein the processor is further operative to update the records in the database whenever a user-plane bearer is modified.

16. A method for maintaining monitoring of General Packet Radio Service (GPRS) Tunneling Protocol (GTP) sessions in a mobile communication network after an outage of a monitoring device, the method comprising the steps of: storing recovery data and session data by the monitoring device for a plurality of a monitoring session associated with a plurality of GTP sessions, the recovery data including an Internet Protocol (IP) address and tunnel endpoint identifier (TEID) for each GTP session at a start of each GTP session and the session data including statistics related to each GTP session; upon restart of the monitoring device after an outage of monitoring, searching the recovery data for a correlation in new activity data, the new activity data being parameters associated with existing GTP sessions; correlating downlink TEID parameters associated with subsequent session data with uplink TEID parameters associated with initial session data when the subsequent session data and the initial session data corresponds to the same subscriber GTP session; validating the correlation based on the new activity data; and rebuilding the monitoring sessions for the validated GTP sessions, when the correlation is successful, to include new session data based on the new activity data and associating the new session data with the session data corresponding to the corresponding GTP session.

17. A method as recited in claim 16, wherein the recovery data is persistently stored to disk.

* * * * *